US011210799B2

(12) United States Patent
Jacobs et al.

(10) Patent No.: US 11,210,799 B2
(45) Date of Patent: Dec. 28, 2021

(54) ESTIMATING DEPTH USING A SINGLE CAMERA

(71) Applicant: Google LLC, Mountain View, CA (US)

(72) Inventors: David Jacobs, Mountain View, CA (US); Rahul Garg, Mountain View, CA (US); Yael Pritch Knaan, Mountain View, CA (US); Neal Wadhwa, Mountain View, CA (US); Marc Levoy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 16/652,568

(22) PCT Filed: Dec. 5, 2017

(86) PCT No.: PCT/US2017/064678
§ 371 (c)(1),
(2) Date: Mar. 31, 2020

(87) PCT Pub. No.: WO2019/070299
PCT Pub. Date: Apr. 11, 2019

(65) Prior Publication Data
US 2020/0242788 A1 Jul. 30, 2020

Related U.S. Application Data

(60) Provisional application No. 62/567,888, filed on Oct. 4, 2017, provisional application No. 62/572,896, filed on Oct. 16, 2017.

(51) Int. Cl.
*G06T 7/50* (2017.01)
*H04N 5/232* (2006.01)

(52) U.S. Cl.
CPC ......... *G06T 7/50* (2017.01); *H04N 5/232933* (2018.08); *G06T 2207/10024* (2013.01);
(Continued)

(58) Field of Classification Search
None
See application file for complete search history.

(56) References Cited

U.S. PATENT DOCUMENTS 6,683,996 B1 * 1/2004 Walmsley ............... H04N 1/46
382/296
8,711,267 B2 * 4/2014 Ueno ................... H04N 9/0451
348/335

(Continued)

FOREIGN PATENT DOCUMENTS

WO 2013179963 A1 12/2013

OTHER PUBLICATIONS

Ikehata, Satoshi, and Kiyoharu Aizawa. "Confidence-based refinement of corrupted depth maps." Proceedings of The 2012 Asia Pacific Signal and Information Processing Association Annual Summit and Conference. IEEE, 2012. (Year: 2012).*

(Continued)

*Primary Examiner* — Andrae S Allison
(74) *Attorney, Agent, or Firm* — McDonnell Boehnen Hulbert & Berghoff LLP

(57) ABSTRACT

A camera may capture an image of a scene and use the image to generate a first and a second subpixel image of the scene. The pair of subpixel images may be represented by a first set of subpixels and a second set of subpixels from the image respectively. Each pixel of the image may include two green subpixels that are respectively represented in the first and second subpixel images. The camera may determine a disparity between a portion of the scene as represented by the pair of subpixel images and may estimate a depth map of the scene that indicates a depth of the portion relative to other portions of the scene based on the disparity and a baseline distance between the two green subpixels. A new (Continued)

version of the image may be generated with a focus upon the portion and with the other portions of the scene blurred.

20 Claims, 11 Drawing Sheets

(52) U.S. Cl.
CPC .............. *G06T 2207/10028* (2013.01); *G06T 2207/20084* (2013.01)

(56) References Cited

U.S. PATENT DOCUMENTS

| | | | |
|---|---|---|---|
| 8,866,920 B2* | 10/2014 | Venkataraman | G06T 7/50 348/218.1 |
| 9,736,366 B1* | 8/2017 | Barron | G06K 9/6203 |
| 2008/0259154 A1 | 10/2008 | Garrison et al. | |
| 2011/0080487 A1* | 4/2011 | Venkataraman | H04N 5/332 348/218.1 |
| 2012/0050589 A1* | 3/2012 | Ueno | H04N 9/0451 348/274 |
| 2013/0215108 A1* | 8/2013 | McMahon | G06T 19/20 345/419 |
| 2013/0287093 A1* | 10/2013 | Hannuksela | H04N 19/30 375/240.02 |
| 2015/0062384 A1 | 3/2015 | Tanaka | |
| 2015/0086127 A1 | 3/2015 | Camilus et al. | |
| 2015/0170337 A1* | 6/2015 | Peng | H04N 5/347 382/298 |
| 2017/0264811 A1* | 9/2017 | Ollila | H04N 5/232122 |

OTHER PUBLICATIONS

Schwarz, S. et al. "Depth map upscaling through edge-weighted optimization." Electronic Imaging (2012). (Year: 2012).*
Zhou, Tinghui, et al. "Unsupervised learning of depth and ego-motion from video." Proceedings of the IEEE conference on computer vision and pattern recognition. Aug. 2017. (Year: 2017).*
Jang, Jinbeum, et al. "Depth map generation using a single image sensor with phase masks." Optics express 24.12 (2016): 12868-12878. (Year: 2016).*
Liu, Fayao, Chunhua Shen, and Guosheng Lin. "Deep convolutional neural fields for depth estimation from a single image." Proceedings of the IEEE conference on computer vision and pattern recognition. 2015. (Year: 2015).*
Eigen, David, Christian Puhrsch, and Rob Fergus. "Depth map prediction from a single image using a multi-scale deep network." arXiv preprint arXiv:1406.2283 (2014). (Year: 2014).*
Gur, Shir, and Lior Wolf. "Single image depth estimation trained via depth from defocus cues." Proceedings of the IEEE/CVF Conference on Computer Vision and Pattern Recognition. 2019. (Year: 2019).*
Mertan, Alican, Damien Jade Duff, and Gozde Unal. "Single Image Depth Estimation: An Overview." arXiv preprint arXiv: 2104.06456 (2021). (Year: 2021).*
International Search Report dated Apr. 11, 2018, issued in connection with International Application No. PCT/US2017/064678, filed on Dec. 5, 2017, 4 pages.
Written Opinion dated Apr. 11, 2018, issued in connection with International Application No. PCT/US2017/064678, filed on Dec. 5, 2017, 7 pages.

* cited by examiner

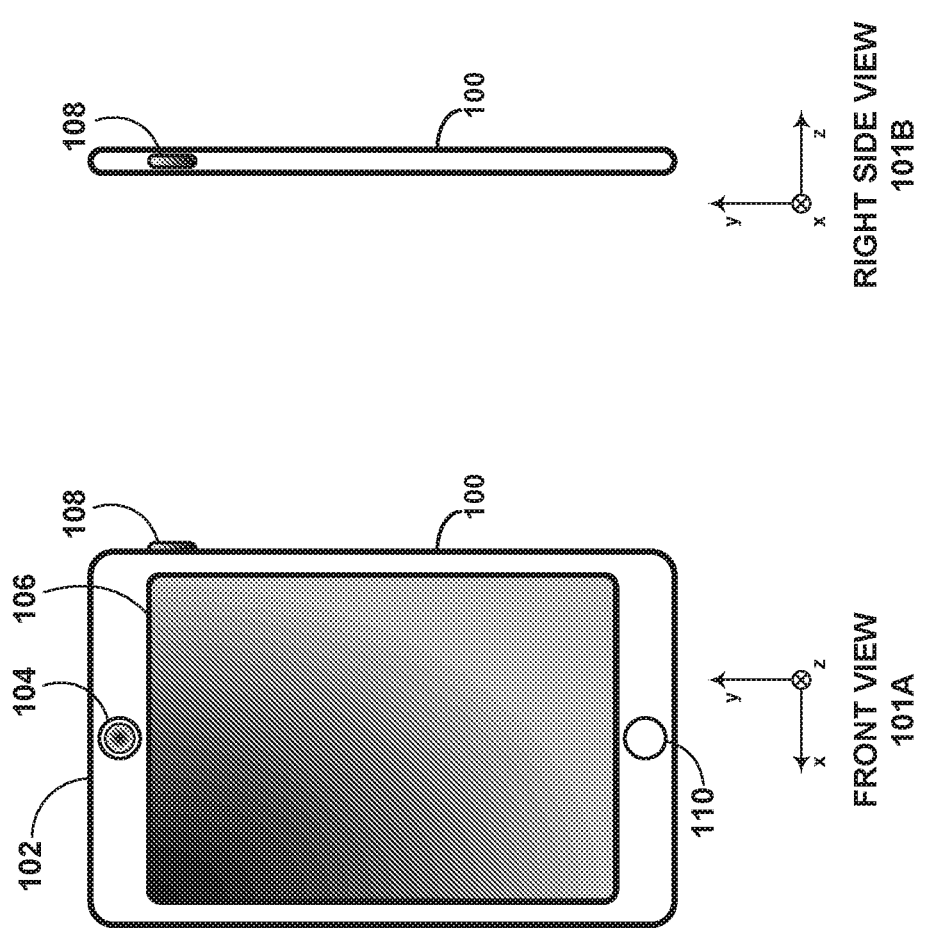

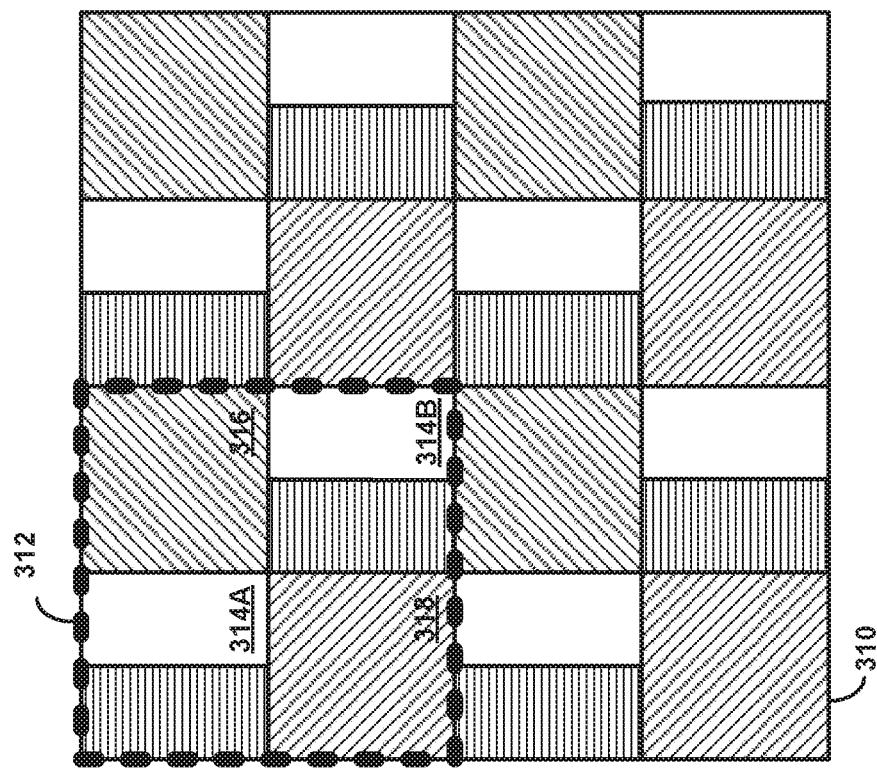
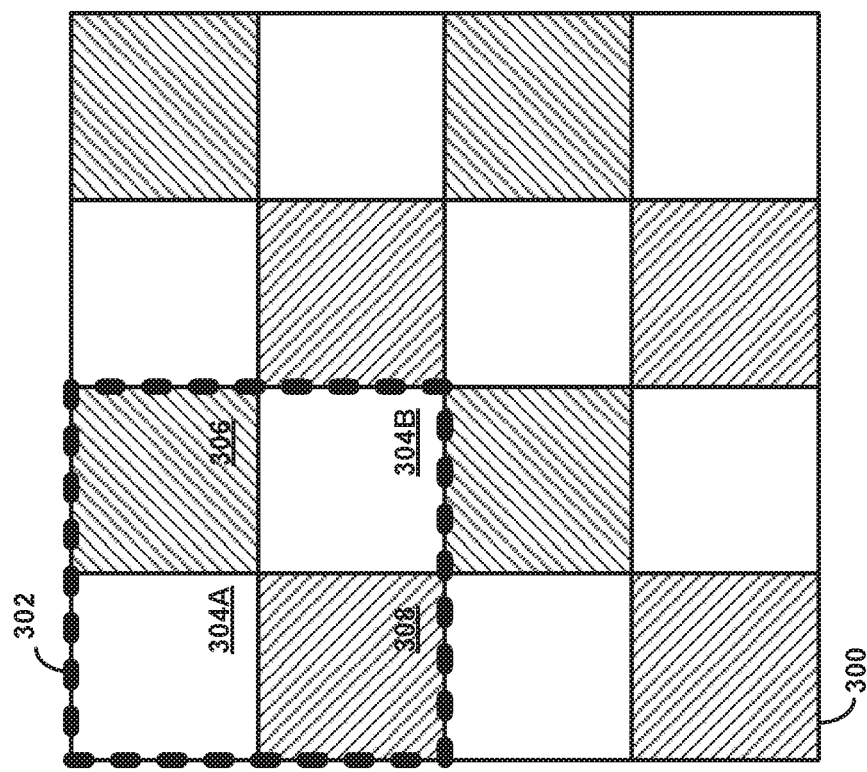
FIG. 3A
FIG. 3B

ESTIMATING DEPTH USING A SINGLE CAMERA

CROSS-REFERENCE TO RELATED APPLICATIONS

The present application is the US National Phase under 35 U.S.C. § 371 of International Application PCT/US2017/064678, filed Dec. 5, 2017, which claims priority to U.S. Provisional Patent Application No. 62/567,888, filed Oct. 4, 2017, and U.S. Provisional Patent Application No. 62/572,896, filed Oct. 16, 2017, the entire contents of each are herein incorporated by reference.

BACKGROUND

When an image capture component of a digital camera takes a picture of a scene, an image sensor collects data about the light coming through a photographic lens of the camera. In particular, upon receiving a signal to capture the image (e.g., a button push), a shutter of the camera may open temporarily to allow light to reach an array of photosites of the image sensor. As a result, each photosite may collect and store photons from the light as an electrical signal.

The greater the amount of light collected by a photosite, the higher the electrical intensity that the photosite records. For example, the photosites of the image sensor that capture light from bright areas in the scene record higher intensities compared to lower intensities recorded by photosites that captured light from shadows or other dark areas in the scene. By having an array of photosites configured to capture and measure intensities, the image sensor can record a present state of the scene for subsequent display as a greyscale image.

In order to convey the scene as a color image, the image sensor may have a color filter array (CFA) positioned nearby that limits each photosite to only collect incoming light for a particular color. For example, a Bayer array is a popular type of CFA that uses alternating rows of red-green and green-blue filters to limit each photosite to capture light that corresponds to only one of the primary colors (red, green, or blue). The Bayer array includes more green filters to cause a greater percentage of the photosite array to collect green light. This is due to the human eye particular sensitivity to green light. Thus, having more photosites collect green light can produce images more aligned with the vision of most people.

After the shutter of the camera device closes to end the light exposure upon the array of photosites, the charges from the individual photosites can be measured and converted into a digital number. The series of digital numbers from the array of photosites can then be used to reproduce the image by configuring the color and brightness of matching pixels that are used to recreate the image on a screen or other potential surface (camera viewfinder). In some instances, for every photosite in the image sensor, there may be a corresponding pixel within the displayed image that reflects the charge and color received at the photosite during image capture.

Each pixel within the generated image may be made up of multiple components, also known as "subpixels". The subpixels of each pixel may depend on the color limitations imposed upon the array of photosites by the CFA used with the image sensor. For example, when an image sensor is used with a Bayer array, the pixels that make up a captured image may be composed of two green subpixels, a blue subpixel, and a red subpixel. Thus, when the pixels are arranged and displayed together to represent the positions and measurements of the array of photosites of the image sensor, the colors and configuration of the scene as originally captured by the single image capture component may be recreated as a two-dimensional (2D) color image.

In order to obtain three-dimensional (3D) information about the scene, however, additional components are typically used. For instance, a stereo camera uses two or more image capture components to simultaneously capture multiple images that can be combined in some fashion to create or simulate a 3D stereoscopic image. Although the stereo camera can determine 3D information about the scene, the use of multiple image capture components increases the overall cost and complexity involved with producing the stereo camera.

SUMMARY

The embodiments herein disclose a depth estimation technique that can be used to estimate the depth of elements in a scene captured as an image by a single image capture component. After initially capturing an image of the scene, a pair of subpixel images may be generated based on data provided by the subpixels that make up the underlying pixels arranged to recreate the scene. Similar to images simultaneously captured by multiple image capture components of a stereo camera, the pair of subpixel images may represent the scene from slightly different viewpoints. This difference in viewpoints or "disparity" between the subpixel images may be due to a baseline distance that exists between pairs of green subpixels that are included within each pixel of the image. Although the baseline distance that exists between green subpixels within each pixel is quite miniscule, the distance is enough to cause the subpixel images to represent the scene from slightly different angles.

Accordingly, the subpixel images may be aligned in a manner that enables the disparity between a portion of the scene as respectively represented by each subpixel image to be determined. By factoring the disparity and the baseline distance between the green subpixels within each pixel, depths of elements of the scene may be estimated using triangulation. In some embodiments, a depth map depicting depths of elements in the scene may be determined and used to generate a new version of the original image that focuses upon a particular element of the scene while also blurring other portions of the image in a manner similar to the Bokeh effect.

Accordingly, in a first example embodiment, a camera device may capture an image of a scene. Based on the image of the scene, the camera device may generate a first subpixel image of the scene and a second subpixel image of the scene. The first subpixel image may be represented by a first set of subpixels from the image and the second subpixel image may be represented by a second set of subpixels from the image. A given pixel of the image of the scene may include two green subpixels that are respectively represented in the first subpixel image and the second subpixel image. The camera device may determine a disparity between a portion of the scene as represented by the first subpixel image and the portion of the scene as represented by the second subpixel image. Possibly based on the disparity and a baseline distance between the two green subpixels, the camera device may estimate a depth map of the scene. The depth map may indicate a depth of the portion of the scene relative to one or more other portions of the scene.

In a second example embodiment, an article of manufacture may include a non-transitory computer-readable medium, having stored thereon program instructions that, upon execution by a camera device, cause the camera device to perform operations in accordance with the first example embodiment.

In a third example embodiment, a camera device may include an image sensor, a processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 1A depicts front and right side views of a digital camera device, according to example embodiments.

FIG. 3A depicts a pixel block configuration, according to example embodiments.

FIG. 3B depicts another pixel block configuration, according to example embodiments.

DETAILED DESCRIPTION

Figure 1B:
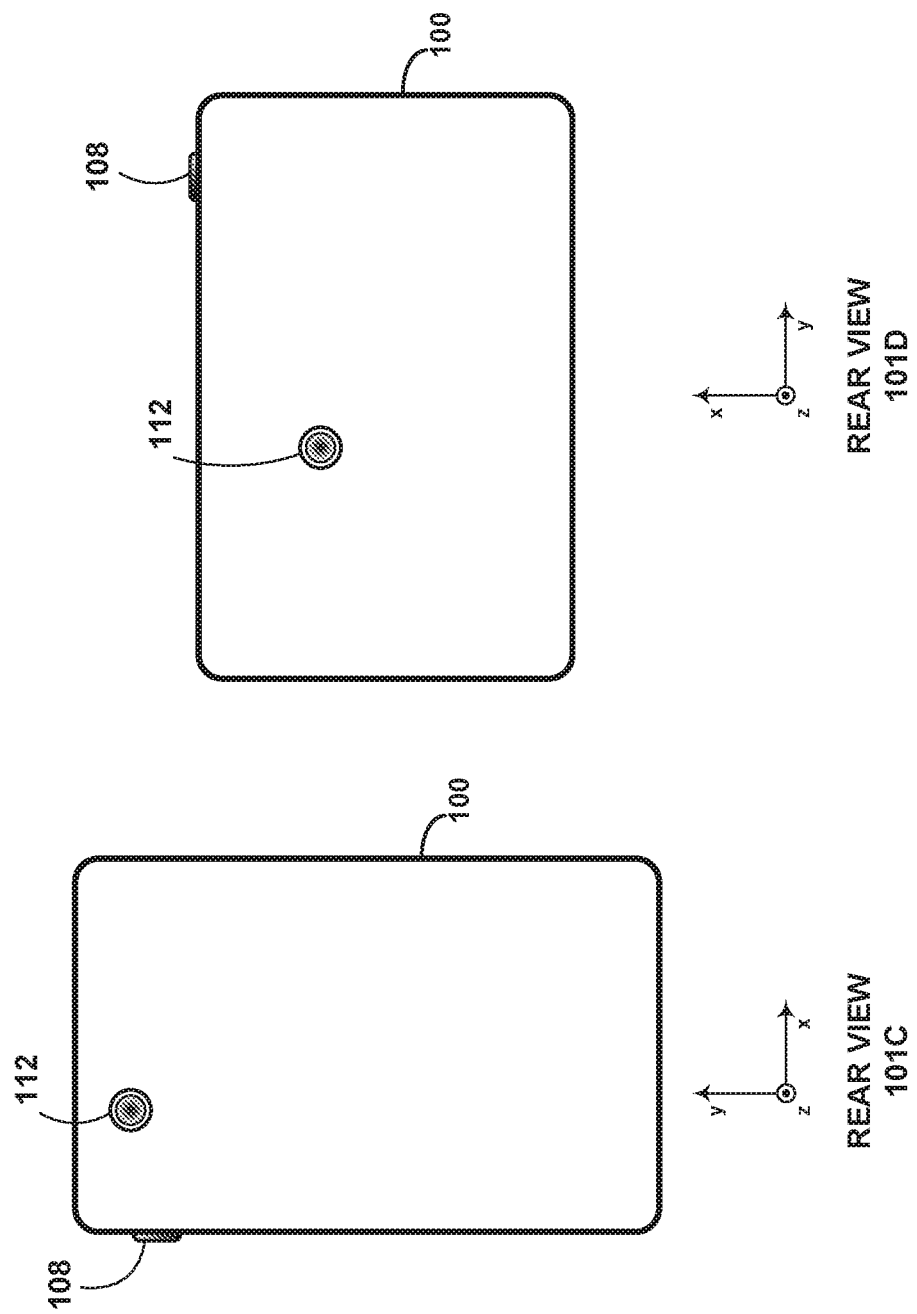
FIG. 1B depicts rear views of a digital camera device, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Depending on context, a "camera" may refer to an individual image capture component, or a device that contains one or more image capture components. In general, image capture components include an aperture, lens, recording surface, and shutter, as described below. Moreover, in some implementations, the image processing steps described herein may be performed by a camera device, while in other implementations, the image processing steps may be performed by a computing device in communication with (and perhaps controlling) one or more camera devices.

1. EXAMPLE IMAGE CAPTURE DEVICES

As cameras become more popular, they may be employed as standalone hardware devices or integrated into other types of devices. For instance, still and video cameras are now regularly included in wireless computing devices (e.g., smartphones and tablets), laptop computers, wearable computing devices, video game interfaces, home automation devices, and even automobiles and other types of vehicles.

An image capture component of a camera may include one or more apertures through which light enters, one or more recording surfaces for capturing the images represented by the light, and one or more lenses positioned in front of each aperture to focus at least part of the image on the recording surface(s). The apertures may be fixed size or adjustable.

In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory). The image sensor may include an array of photosites configured to capture incoming light through an aperture. When exposure occurs to capture an image, each photosite may collect photons from incoming light and store the photons as an electrical signal. Once the exposure finishes, the camera may close each of the photosites and proceed to measure the strength of the electrical signal of each photosite.

The signals of the array of photosites of the image sensor can then be quantified as digital values with a precision that may be determined by the bit depth. Bit depth may be used to quantify how many unique colors are available in an image's color palette in terms of "bits" or the number of 0's and 1's, which are used to specify each color. This does not mean that the image necessarily uses all of these colors, but that the image can instead specify colors with that level of precision. For example, for a grayscale image, the bit depth may quantify how many unique shades are available. As such, images with higher bit depths can encode more shades or colors since there are more combinations of 0's and 1's available.

As indicated above, to capture a scene in a color image, a CFA positioned nearby the image sensor may permit only one color of light from entering into each photosite. For example, a digital camera may include a CFA (e.g., Bayer array) that allows photosites of the image sensor to only capture one of three primary colors (red, green, blue (RGB)). Other potential CFAs may use other color systems, such as cyan, magenta, yellow, and black (CMYK). As a result, the photosites may measure the colors of the scene for subsequent display in a color image.

In some examples, a camera may utilize a Bayer array that consists of alternating rows of red-green and green-blue filters. Within the Bayer array, each primary color does not receive an equal fraction of the total area of the photosite array of the image sensor because the human eye is more sensitive to green light than both red and blue light. Particularly, redundancy with green pixels may produce an image that appears less noisy and more detailed. As such, the camera may approximate the other two primary colors in order to have full color at every pixel when configuring the color image of the scene. For example, the camera may perform Bayer demosaicing or an interpolation process to translate the array of primary colors into an image that contains full color information at each pixel. Bayer demosaicing or interpolation may depend on the image format, size, and compression technique used by the camera.

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photosites. While the electronic shutter remains open, the photosites may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras may include software to control one or more camera functions and/or settings, such as aperture size, exposure time, gain, and so on. Additionally, some cameras may include software that digitally processes images during or after when these images are captured. The software maybe capable of generating subpixel images based on a captured image. A subpixel image may represent a portion of the subpixels included within all or a set of pixels that make up a captured image. For instance, software may be used to generate a first subpixel image that represents data from half of the green subpixels within each pixel of the image and a second subpixel image that represents data from the other half of the green subpixels within each pixel of the image.

As noted previously, digital cameras may be standalone devices or integrated with other devices. As an example, FIG. 1A illustrates the form factor of a digital camera device 100 as seen from front view 101A and side view 101B. Digital camera device 100 may be, for example, a mobile phone, a tablet computer, or a wearable computing device. However, other embodiments are possible.

Digital camera device 100 may include various elements, such as a body 102, a front-facing camera 104, a multi-element display 106, a shutter button 108, and other buttons 110. Front-facing camera 104 may be positioned on a side of body 102 typically facing a user while in operation, or on the same side as multi-element display 106.

As depicted in FIG. 1B, digital camera device 100 could further include rear-facing camera 112. Camera 112 may be positioned on a side of body 102 opposite front-facing camera 104. Rear views 101C and 101D show two alternate arrangements of rear-facing camera 112. Nonetheless, other arrangements are possible. Also, referring to the cameras as front facing or rear facing is arbitrary, and digital camera device 100 may include one or multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by any one or more of these cameras. Thus, multi-element display 106 may serve as a viewfinder for the cameras. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic camera, for example. Rear-facing camera 112 may be an image capture component, including an aperture, lens, recording surface, and shutter.

Either or both of front facing camera 104, and rear-facing camera 112, may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover 3D models from an object are possible within the context of the embodiments herein.

Either or both of front facing camera 104, and/or rear-facing camera 112, may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. The ambient light sensor may also be used to determine an exposure times for image capture.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless computing device, cell phone, tablet computer, wearable computing device, robotic device, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
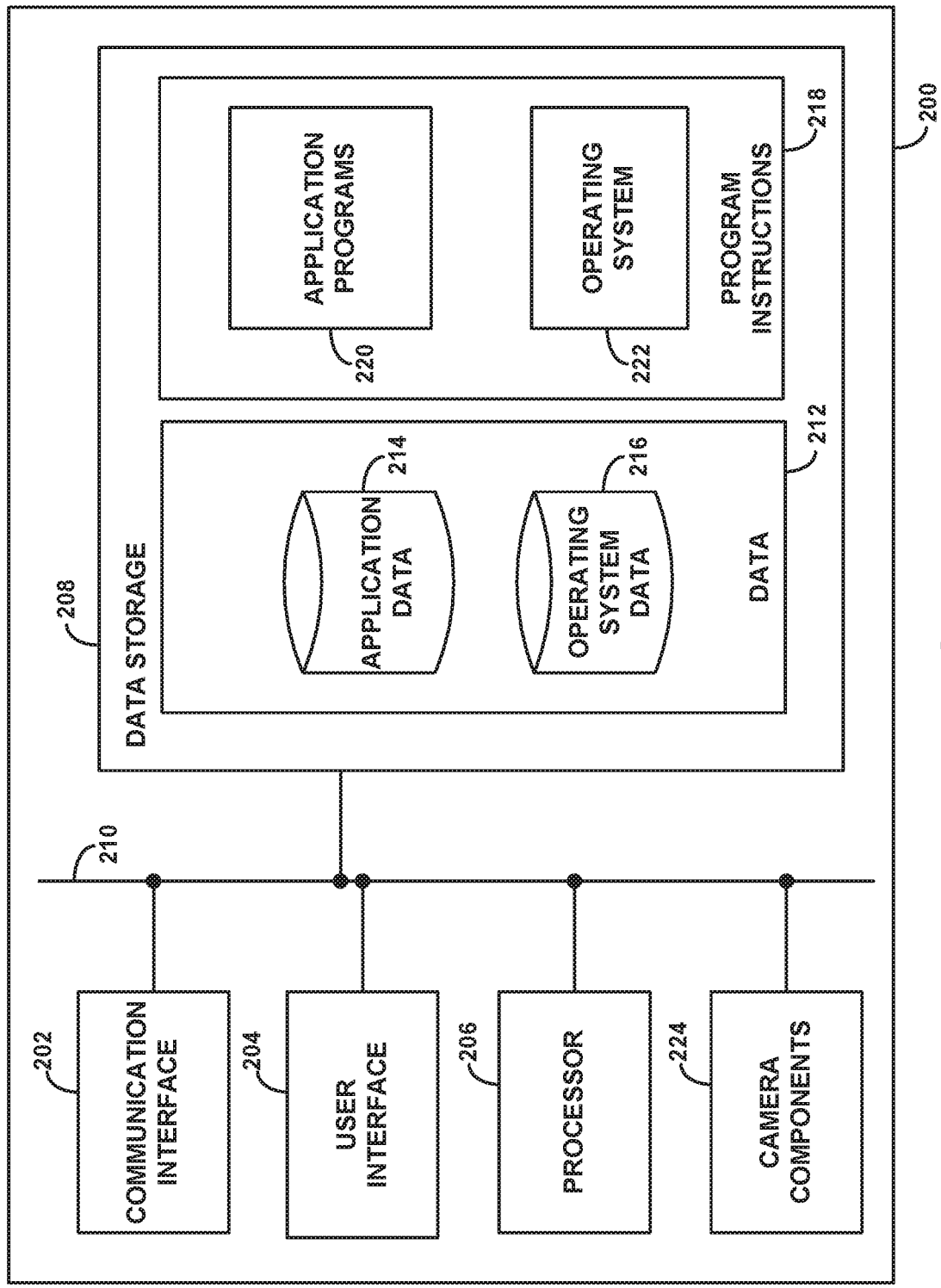
FIG. 2 depicts a block diagram of a computing device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

2. EXAMPLE PIXEL CONFIGURATIONS

FIG. 3A depicts pixel block 300, which is composed of a cluster of pixels that may be part of an image captured by a camera. In particular, pixel block 300 includes pixel 302 and other pixels that may represent data from corresponding photosites in the array of photosites of an image sensor.

The configuration of pixel block 300 as well as pixels within pixel block 300 may differ in other examples. For instance, pixel 302 and other pixels in pixel block 300 are shown in a square configuration made up of four components. These four components, also described herein as subpixels, may express the amounts of red, green, or blue at a given location of an image. Although pixel 302 is shown having four subpixels (green subpixels 304A, 304B, blue subpixel 306, and red subpixel 308), pixels can also be made up of more or fewer subpixels in other examples. For instance, in another example, a pixel may include only three subpixels (e.g., red, green, blue) or other color subpixels (e.g., green, red, blue, white). Additionally, pixels can have other configurations within examples.

The subpixels that make up the pixels within pixel block 300 may depend on the CFA utilized with the image sensor of a camera that captured the image. The CFA limits which lights of given colors can enter which photosites. Thus, instead of receiving light represented of any color, each photosite of the image sensor may be limited to receive light that corresponds to a particular color (e.g., red, green, or blue). As discussed above, some cameras use a Bayer array that results in a higher percentage of the photosites measuring green light. As a result, pixels within an image captured by the camera may each include two green subpixels to reflect the use of the Bayer array with the image sensor. Other configurations are possible.

As shown in FIG. 3A, pixel 302 of pixel block 300 is made up of green subpixels 304A, 304B along with blue subpixel 306 and red subpixel 308. These subpixels are arranged in a two subpixel by two subpixel square within pixel 302. Green subpixel 304A is shown positioned in the top left corner of pixel 302 and green subpixel 304B is shown positioned in the bottom right corner of pixel 302. Although green subpixels 304A, 304B have a diagonal arrangement within pixel 302, the subpixels can have other arrangements.

An image that includes pixel block 300 may be used to generate subpixel images based on the data provided by the subpixels (e.g., green subpixels 304A, 304B). In particular, since each pixel includes two green subpixels, the difference in position of the green subpixels within each pixel may cause the green subpixels to represent the scene captured within the image from slightly different angles. The different angles may be due to the fact that each green subpixel represents data from a photosite with a green filter that captured the scene from a particular viewpoint within the camera.

As a result, by using data from the green subpixels, multiple subpixel images can be generated in a manner such that each subpixel displays the scene from a different viewpoint similar to how the multiple image capture components of a stereo camera capture a scene from slightly different viewpoints. To illustrate with an example, one subpixel image may be developed based on data from green subpixels having the same position as green subpixel 304A within each pixel and another subpixel image may be based on data from green subpixels having the same position as green subpixel 304B within each pixel.

Subpixel images determined based on data from different sets of green subpixels may be further used to determine a disparity that exists between the different viewpoints represented by each subpixel image. In some examples, the disparity represents the difference between the subpixel images. The disparity can arise from the difference in viewpoints represented by the subpixel images. As such, the degree of disparity between the subpixel images can vary.

After aligning the subpixel images, a disparity may be determined based on comparing a portion of the scene as represented by one subpixel image with the same portion of the scene as represented by the other subpixel image. For example, image differencing techniques can be used to determine a disparity between the subpixel images. Image differencing may involve determining the difference between each pixel in each subpixel image. Other image processing techniques can also be used. As such, the resulting disparity indicates the difference between how each subpixel image represents the portion. In some examples, a disparity between the subpixel images may be determined for multiple portions of the scene.

The disparity between how the subpixel images represent one or more portions of the scene may be further used estimate a depth of the portion(s) of the scene within the originally captured image. Within examples, the portion of the scene used to determine the disparity can represent any portion of scene as captured in the original image. In some implementations, a portion of the scene that has a central position within the original image may be used when determining disparity since this portion likely includes a focal point of the image and the subpixel data may be more accurate than subpixel data obtained from pixels positioned in the corners of a captured image. Particularly, the central position of the original image results from photosites that receive direct light during image capture with less interference. This differs from the edges of the original image that result from photosites that likely encounter interference when receiving light during image capture.

In some embodiments, the disparity between subpixel images may be used to estimate depths of one or more elements within the scene. In particular, the disparity along with the baseline difference between the positions of green subpixels within a pixel may be used to estimate a distance via triangulation between the camera that captured the original image and an object in the scene. In further examples, a depth map may be generated based on estimated depths of multiple elements in the scene of a captured image.

FIG. 3B depicts another pixel block 310. Similar to pixel block 300, pixel block 310 provides an example of pixels (e.g., pixel 312) in which the green subpixels are further split into two focus planes. In particular, pixel 312 is shown composed of split-plane green subpixels 314A, 314B, blue subpixel 316, and red subpixel 318 arranged in a two subpixel by two subpixel square. Rather than having two green subpixels that represent different viewpoints of the scene, green subpixels 314A, 314B may each represent different viewpoints due to the split focus planes.

A focal plane may represent the area in a camera where light is focused. For instance, the focal plane may be the distance from the camera at which the sharpest focus is attained. As such, green subpixels 314A, 314B may each represent multiple focal planes due to the manner that light hits the photosite array of the image sensor. This may result in a portion of green subpixel 314A representing a first focal plane and another portion of green subpixel 314A representing a second focal plane resulting in green subpixel 314A representing split focal planes.

In some examples, green subpixels 314A, 314B and other subpixels within pixel block 310 may be used to determine a set of subpixel images that represent a scene from slightly different viewpoints. For example, each subpixel image may represent data from both green subpixels, but only one of the two planes.

3. EXAMPLE DEPTH ESTIMATIONS

Figure 4:
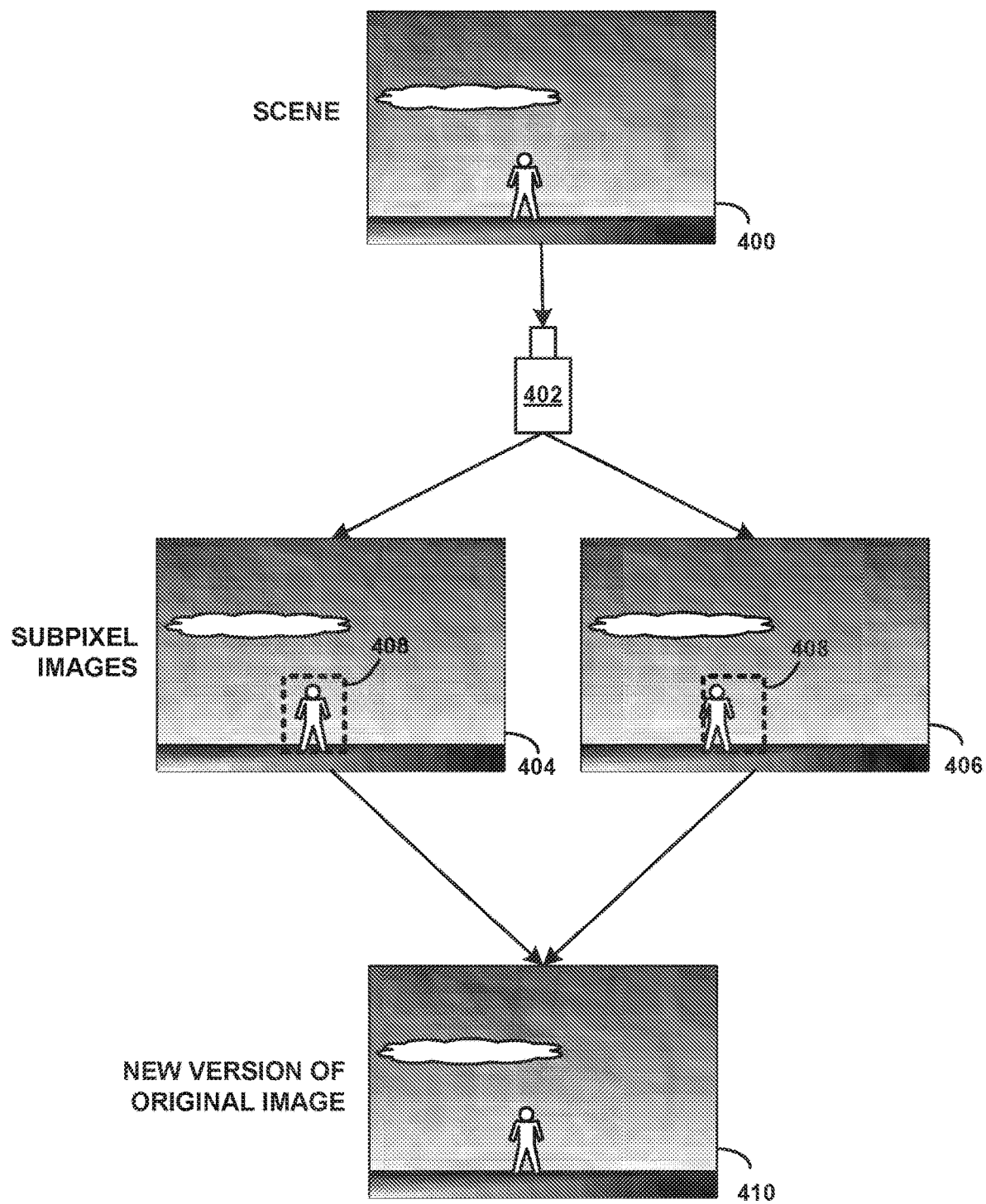
FIG. 4 depicts modifying an image captured using a single image capture component, according to example embodiments.

FIG. 4 depicts generating a new version of an image captured using a single image capture component. In this figure, camera 402 captures an image of scene 400 using a single image capture component. Scene 400 shows a person positioned in a foreground and a cloud positioned in a background, but other examples can involve capturing an image of a different scene.

Camera 402 may include image capture components, such as an aperture, a lens, a shutter, and a recording surface. For instance, camera 402 may correspond to digital camera device 100 and use rear-facing camera 112 to capture an image of scene 400. In other instances, camera 402 may be part of another device, such as a vehicle, wearable computing device, tablet, etc.

Although camera 402 may capture a single image of scene 400, in some implementations, camera 402 may capture a series of images of scene 400 over a short duration. In particular, camera 402 may capture a burst of consecutive images and compare portions of the series of images to produce an aggregate image that removes some of the noise that may be captured within some of the images. Noise within images can result from the image sensor or movement of the camera during image capture. To reduce noise, camera 402 may utilize a series of images of scene 400 to develop an overall image that reduces potential noise. In addition, camera 402 may also increase or decrease the sensitivity of the image sensor based on the amount of ambient light available.

Using information from the subpixels that make up all or a portion of the pixels of the initial image of scene 400, camera 402 may generate first subpixel image 404 and second subpixel image 406. In particular, first subpixel image 404 may be represented by a first set of subpixels from the initial image and second subpixel image 406 may be represented by a second set of subpixels from the initial image.

As an example, first subpixel image 404 may represent data obtained from blue and red subpixels as well as a first set of green subpixels (e.g., a top row green subpixel in each pixel) in order to represent scene 400 from a first angle. In the example, second subpixel image 406 may represent data obtained from blue and red subpixels as well as a second set of green subpixel (e.g., a bottom row green subpixel in each pixel) to represent scene 400 from a second angle. The second angle and the first angle may differ due to a baseline difference in the positions between the green subpixels within each pixel. For instance, the first angle and second angle may differ along a horizontal axis and/or a vertical axis.

In another example, each pixel may include two green subpixels that are each split into two different planes of focus similar to the pixel 312 depicted in FIG. 3B. As a result, first subpixel image 404 may represent a first focus plane of the green subpixels and second subpixel image 406 may represent a second focus plane of the green subpixels.

After generating first subpixel image 404 and second subpixel image 406, a disparity that exists between the different viewpoints represented by the pair of subpixel images may be determined. In some examples, multiple sets of subpixel images may be derived based on data from subpixels within the originally captured image. The multiple sets may be utilized to refine and develop subpixel images capable of being used for estimating depth of elements in the scene captured in the original image.

In further examples, prior to determining the disparity, in some embodiments, camera 402 may perform a normalization process upon first subpixel image 404 and second subpixel image 406 to adjust the brightness or other parameters of each subpixel image to enable further analysis. For example, after aligning the subpixel images, camera 402 may determine that further image processing is required to remove noise within the subpixel images.

In some examples, first subpixel image 404 and second subpixel image 406 may be aligned with one another in order to determine a disparity between portion 408 as represented in both first subpixel image 404 and second subpixel image 406. Image alignment may involve computational methods for arranging first subpixel image 404 and second subpixel image 406 over one another so that they "match." One technique for image alignment is global alignment, in which fixed x-axis and y-axis offsets are applied to each subpixel in one subpixel image so that this subpixel image is substantially aligned with the other subpixel image.

Substantial alignment in this context may be an alignment in which an error factor between the pixels is minimized or determined to be below a threshold value. For instance, a least-squares error may be calculated for a number of candidate alignments, and the alignment with the lowest least squares error may be determined to be a substantial alignment.

In some examples, alignment may involve partitioning a subpixel image into a number of pixel neighborhoods (e.g., block of pixels), and each pixel neighborhood can be aligned separately according to respective individual offsets. The result might be that some blocks are offset differently than others. For each candidate alignment of blocks, the net difference between all pixels in the translated source subpixel image and the target subpixel image may be determined and summed. This net error is stored, and the translation with the minimum error may be selected as a substantial alignment. Other image alignment techniques may be used in addition to or instead of those described herein.

The disparity between one or multiple portions of scene 404 as represented in first subpixel image 404 and as represented in second subpixel image 406 may be determined after the alignment. For instance, a block of pixels that represents a feature of scene 400, such as portion 408, may be selected and used to determine the disparity between how first subpixel image 404 represents the block of pixels and how second subpixel image 406 represents the same block of pixels.

Using the disparity and a baseline distance that specifies the distance between green subpixels within each pixel, camera 402 may estimate a depth of the person in scene 400 positioned in portion 408 of first and second subpixel images 404, 406 that represents the distance between camera 402 and the person. In situations where the scene depicted within an image includes numerous objects, the disparity and baseline distance may be used to estimate depths for multiple objects relative to each other and camera 402. In some examples, an estimated depth map may be determined for scene 400. For instance, the depth map may be determined by iteratively comparing multiple portions of first and second subpixel images 404, 406 to estimate depths of different portions of scene 400.

Estimated depths or a depth map may be subsequently used when modifying the original image. For example, depth estimations of portions of the original image may be used to generate a new version of the image that focuses upon one or more portions of the image while also blurring other portions. This new version of the image may have an appearance that resembles the Bokeh effect, which is the aesthetic quality of the blur produced in the out-of-focus parts of an image produced by a lens of a camera.

In a further example, camera 402 may use an edge smoothing process in addition to the depth estimations when generating the new version of the image. The edge smoothing process may improve the disconnection between a focused upon element and blurred portions within the new version of the image. For instance, edge smoothing may be used to determine edges of an element in focus. As a result, a background behind the element in focus can be blurred up to the detected edges.

In an additional example, camera 402 may further use a spatial sensor or another sensor to estimate depth of one or more portions of the image depicting scene 400. The measurements from the sensor or sensors may supplement other depth estimations performed by camera 402.

In another example, camera 402 may associate confidence levels with depth estimations. For instance, camera 402 may assign a higher confidence for depth estimations for elements in the scene that are central within the captured image and assign a lower confidence for depth estimations for elements in the scene positioned near the border of the image. This assignment may be due to the way photosites receive light during image capture.

In some embodiments, camera 402 may determine the disparity of a portion of the scene that includes a feature with a corner. In these cases, determining the disparity between the portion of the scene as represented in the subpixel images may involve detecting the corner in each subpixel image, and warping a subpixel image to the other according to a translation. The translation may cause the corner in the subpixel images to substantially match. As a result, the disparity may be based on a pixel distance represented by the translation.

Figure 5:
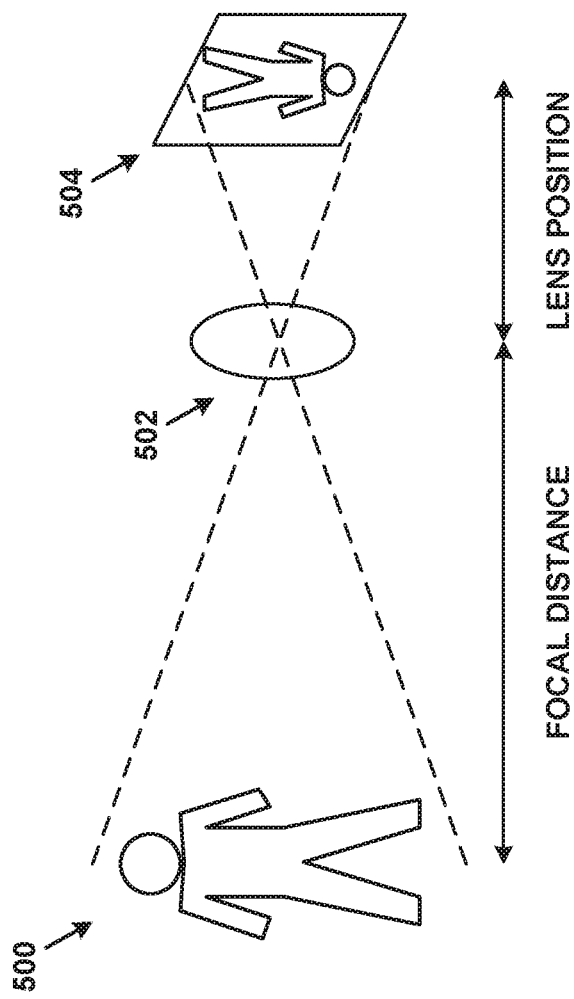
FIG. 5 depicts a simplified representation of an image capture component capturing an image of an object, according to example embodiments.

FIG. 5 depicts a simplified representation of an image capture component capturing an image of an object. The image capture component includes a lens 502 and a recording surface 504. Light representing object 500 passes through lens 502 and creates an image of object 500 on recording surface 504 (due to the optics of lens 502, the image on recording surface 504 appears upside down). Lens 502 may be adjustable, in that it can move left or right with respect to FIG. 5. For instance, adjustments may be made by applying a voltage to a motor (not shown in FIG. 5) controlling the position of lens 502. The motor may move lens 502 further from or closer to recording surface 504. Thus, the image capture component can focus on objects at a range of distances. The distance between lens 502 and recording surface 504 at any point in time is known as the lens position, and is usually measured in millimeters. The distance between lens 502 and its area of focus is known as the focus distance, and may be measured in millimeters or other units.

Focal length is an intrinsic property of a lens, and is fixed if the lens is not a zoom lens. The lens position refers to the distance between lens surface and recording surface. The lens position can be adjusted to make objects appear sharp (in focus). In some embodiments, lens position is approximated by focal length—if the lens is driven to focus at infinity, then the lens position is equal to focal length. Thus, focal length is known and fixed for non-zoom image capture components, while lens position is unknown but can be estimated to focus the image capture component on an object.

Autofocus is a methodology used to focus an image capture component with little or no assistance from a user. Autofocus may automatically select an area of a scene on which to focus, or may focus on a pre-selected area of the scene. Autofocus software may automatically adjust the lens position of the image capture component until it determines that the image capture component is sufficiently well-focused on an object.

As discussed above, after capturing an image, subpixel images may be derived based on data within subpixels of the pixels that make up the captured image. Similar to capturing two images simultaneously using a stereo camera configured with multiple image capture components, the subpixel images that originate from a captured image may provide a viewpoint of a scene from slightly different positions due to spacing of subpixels within each pixel of the image. Although the baseline distance between the positions of green subpixels within each pixel is miniscule, this baseline distance is enough to enable the green subpixels to convey the scene captured within an image from slightly different viewpoints similar to the pair of images captured by a stereo camera.

Figure 6:
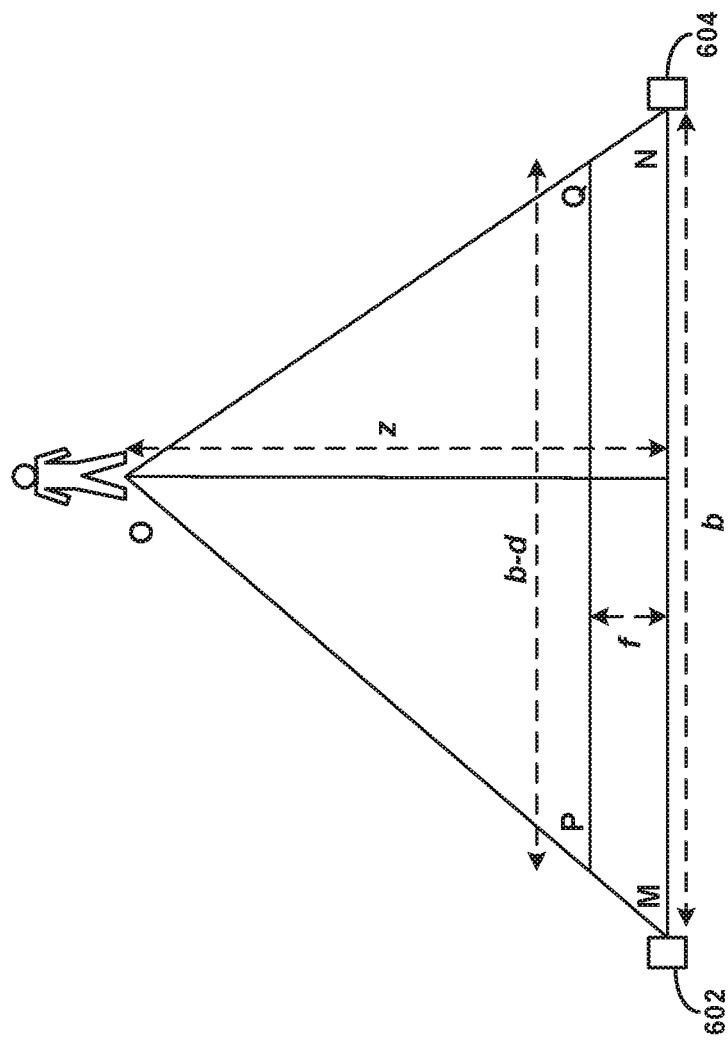
FIG. 6 depicts determining the distance between an object and a camera, according to example embodiments.

Triangulation based on the baseline distance between the green subpixels within a pixel and an object in the scene can be used to estimate the distance from the image capture components to the object. Turning to FIG. 6, first green subpixel 602 and second green subpixel 604 represent subpixels within a pixel of an image and are assumed to be a baseline distance of b apart from one another on the x-axis (horizontal). Although FIG. 6 displays first green subpixel 602 and second green subpixel 604 as having a clearly visible distance in between, this configuration is for illustration purposes. In actuality, first green subpixel 602 and second green subpixel 604 are likely positioned at a miniscule distance apart due to the tiny nature of pixels in general.

The camera capturing an image of the object has a focal length of f (the position and magnitude of which are exaggerated in FIG. 6 for purpose of illustration). As a result, first green subpixel 602 and second green subpixel 604 have data depicting an object that is a distance z (i.e., depth) from the camera on the z-axis. The values of b and f are known, but the value of z is to be estimated.

One way of doing so is to determine subpixel images of the object based on data from first green subpixel 602 and second green subpixel 604, respectively. Due to differences in positions of first and second green subpixels 602, 604 within each pixel of a captured image, the object will appear slightly to the right in the subpixel image based on first green subpixel 602 and slightly to the left in the subpixel image based on second green subpixel 604. This x-axis distance between the object as it appears in the subpixel images is the disparity, d.

A first triangle, MNO, can be drawn between first green subpixel 602, second green subpixel 604, and the object. Also, a second triangle, PQO, can be drawn from point P (where the object appears in the subpixel image based on first green subpixel 602) to point Q (where the object appears in the subpixel image based on second green subpixel 604), to point O.

Formally, triangle MNO and triangle PQO are similar triangles, in that all of their corresponding angles have the same measure. As a consequence, they also have the same ratio of width to height. Therefore:

$$\frac{b}{z} = \frac{b-d}{z-f} \quad (1)$$

$$b(z-f) = z(b-d) \quad (2)$$

$$bz - bf = bz - dz \quad (3)$$

$$-bf = -dz \quad (4)$$

$$z = \frac{bf}{d} \quad (5)$$

In this manner, the distance z from the camera to the object can be directly estimated. The only remaining unknown is the disparity d. But this value can be estimated based on the subpixel images developed based on first green subpixel 602 and second green subpixel 604.

Figure 7:
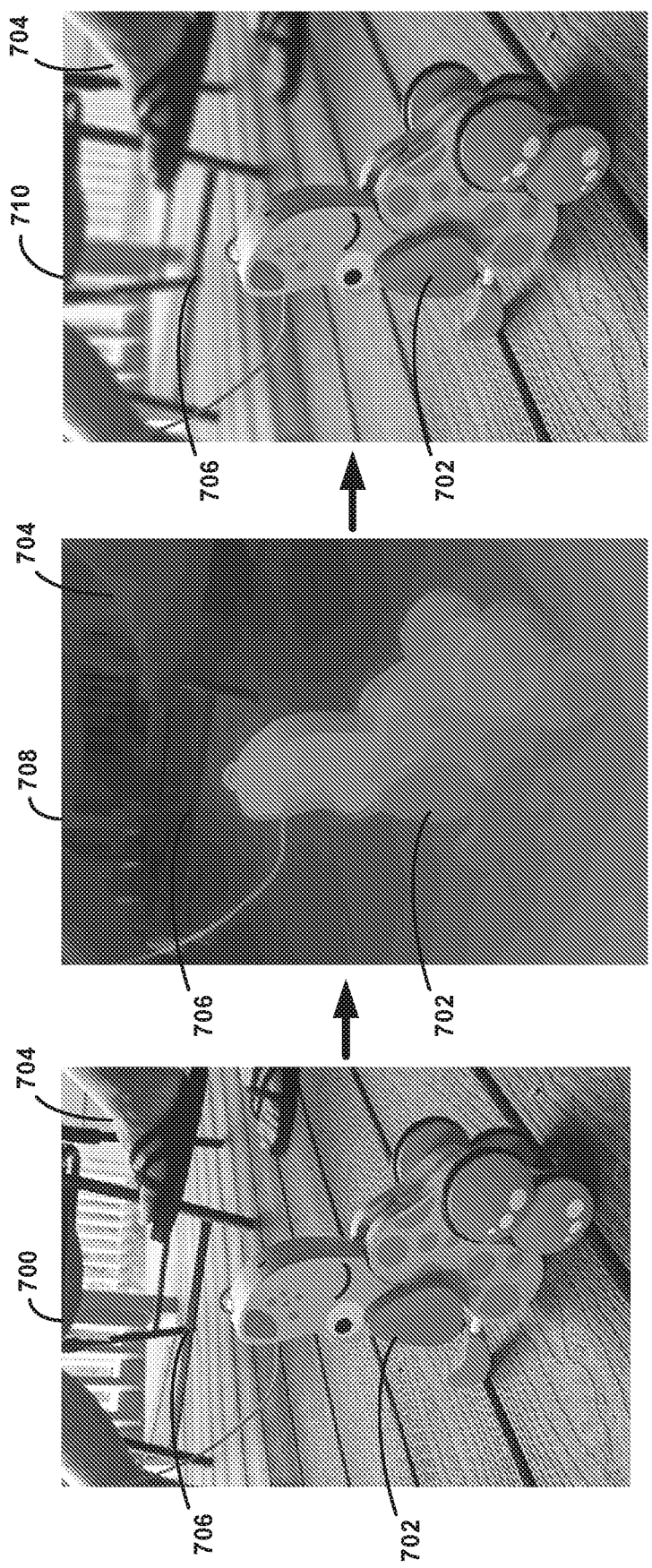
FIG. 7 depicts modifying an image captured using a single image capture component, according to example embodiments.

FIG. 7 depicts generating a focused image using a single image capture component. Input image 700 may be captured by a single image capture component and is shown depicting a scene with a toy dog 702 positioned on a deck in front of a person's feet 704 and a chair 706. As shown in FIG. 7, input image 700 shows all elements in a 2D image as a clear presentation without any portions blurred.

After capturing input image 700, depth map 708 may be determined. In particular, depth map 708 may depict estimated depths of elements within the scene of input image 700. To develop depth map 708, a pair of subpixel images may be derived based on subpixel information obtained from the pixels of input image 700. As discussed above, due to miniscule differences in the positions of green subpixels within pixels of input image 700, the subpixel images may represent the scene from different viewpoints in a manner similar to the different images captured by multiple image capture components of a stereo camera. As a result, depth map 708 may be developed using triangulation.

Depth map 708 shows estimated depths of portions of input image 700 with lighter portions (e.g., toy dog 502) indicating elements positioned closer to the camera compared to darker portions (e.g., feet 704, chair 706) positioned in the background. The camera device may generate depth map 708 that roughly estimates relative depths of elements of input image 700. As shown, the shading in depth map 708 appears to indicate that toy dog 702 is positioned in a foreground (e.g., lighter shading) while feet 704 and chair 706 appear to have positions in a background (e.g., darker shading). In other words, depth map 708 indicates that toy dog 702 was positioned closer to the camera during image capture compared to feet 704 and chair 706.

Modified image 710 represents a modified version of the originally captured input image 700. In particular, modified image 710 has a focus upon toy dog 702 and further blurs feet 704 and chair 706 in a manner similar to the Bokeh effect. After estimating depth map 708, modified image 710 may be developed based on estimated depths of elements within the originally captured input image 700.

In some examples, generating modified image 710 may involve sharpening portions of the image to increase image contrast. Particularly, sharpening may enhance the definition of edges in modified image 710. For example, the edges of toy dog 702 may be sharpened. Sharpening may be performed in one step or a series of iterations.

In further examples, generating modified image 710 may involve blurring one or more portions of the image. Blurring may remove image grain and noise from input image 700. In some instances, blurring may involve adding or removing noise to portions of modified image 710 to create the blur effect. A Gaussian blur may be used, which involves blurring a portion of an image by a Gaussian function. Unlike the Bokeh effect, a Gaussian blur may produce a smooth blur similar to viewing portions of the image through a translucent screen. As such, Gaussian blurring may be performed to enhance image elements. In other examples, other types of blurring effects can be used. For instance, a circular box blur may be used to blur background elements of modified image 710.

In some examples, generating the new version of the image with the focus upon the portion of the scene and with the one or more other portions of the scene blurred may involve performing edge aware smoothing. In particular, edge aware smoothing may enable a focused upon portion in the new version to have smooth edges relative to the one or more other portions of the scene that are blurred.

In some embodiments, the portions focused upon and the portions blurred within modified image 710 may factor a user input originally received when capturing input image 700. For instance, when preparing to capture input image 700, the camera device may display the viewpoint for the potential image of the camera using a viewfinder. The viewfinder may be a touchscreen that enables a user to select a portion of the scene that the camera should focus upon during image capture. As a result, when generating modified image 710, the camera device may factor the prior selection of the scene by the user when determining which element (e.g., toy dog 502) to focus upon and which elements to blur within modified image 710.

Figure 8:
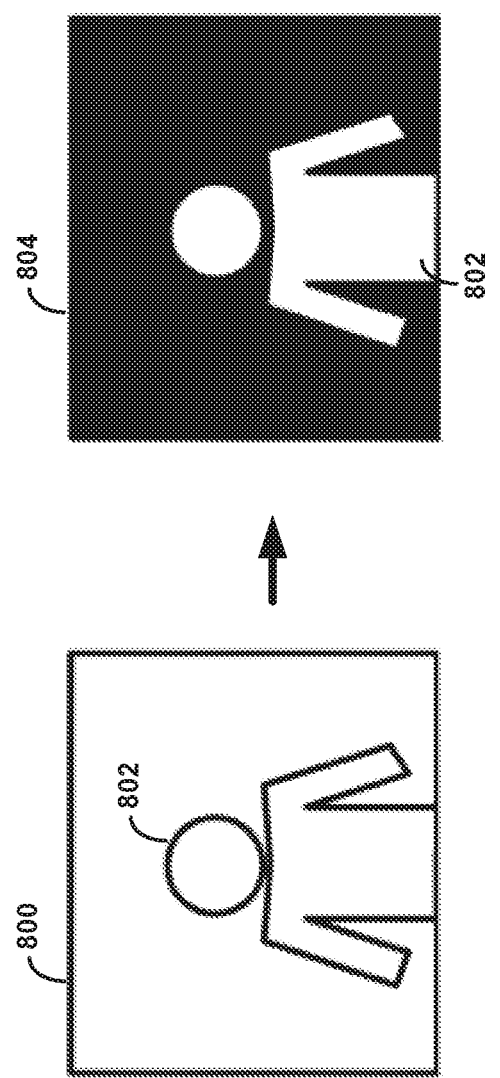
FIG. 8 depicts modifying an image captured using a single image capture component, according to example embodiments.

FIG. 8 depicts another example of modifying an image captured using a single image capture component. Input image 800 is an image of person 802 captured by a camera, such as front-facing camera 104 of digital camera device 100 shown in FIG. 1A.

After capturing input image 800, the camera or another computing system may perform a cursory review of the image contents using image processing or computer vision software. In response to the cursory review, the camera may determine that person 802 is present within input image 800.

In some examples, the cursory review of input image 800 may involve using a neural network process to detect person 802 within input image 800. For instance, the neural network process may involve scanning layers of input image 800 to detect a face or other portions of person 802 that indicate the presence of a person within input image 800. After detecting person 802, the neural network process may involve dividing input image 800 into segments to further separate segments of input image 800 that include person 802 and segments that do not. In some examples, edge detection may be used to find boundaries of the objects within input image 800, including edges of person 802. Edge detection may detect discontinuities in brightness and be used for image segmentation and data extraction.

As shown in output image 804, the neural network process may further colorize portions of input image 800 that represent person 802 as white and colorize portions of input image 800 that do not represent person 802 as black. Using this binary process, the camera may differentiate between the main focal point (i.e., person 802) of input image 800 and other portions of input image 800. As a result, the camera may modify input image 800 to focus upon person 802 and blur a background behind person 802 as dictated in output image 804. In further examples, the camera may apply one or more other image processes techniques upon input image 800 of person 802.

In some examples, upon an initial analysis of input image 800 using image processing, the camera may determine that person 802 is positioned relative to another object (e.g., a table). Depending on the proximity between person 802 and the other within the image, the camera may supplement the analysis using a depth estimation technique as described above. For example, the camera may generate subpixel images based on input image 800 and use the subpixel images to estimate a depth map that corresponds to the scene captured in input image 800. As discussed above, the camera device may generate a first subpixel image that reflects data from a first green subpixel in all the pixels and a second subpixel image that reflects data from a second green subpixel in all the pixels in the image. The slight difference in the positions of the green subpixels within the pixels may cause the generated subpixel images to convey the scene from slightly different viewpoints.

The camera device may use the pair of subpixel images to determine a disparity between one or more portions of the scene as respectively represented by each of the subpixel image. Based on the determined disparity between the subpixel images and the baseline distance that exists between the two green subpixels within a pixel, the camera device may estimate a coarse depth map of the scene. The depth map may approximately indicate relative depth of objects within the captured image.

In some implementations, the camera device may use the depth map to generate a new version of the initial image that includes a focus upon a particular object or person (e.g., person 802) or portion of the image while also blurring other portions of the scene. The camera device may identify a portion of the image to focus upon depending on a general layout of the scene captured within the image or based on additional information (e.g., a user input that specified a focal point during image capture). As such, the camera may use a combination of segmented image 804 and the estimated depth map to generate a new version of input image 800 that focuses upon person 802 and blurs other elements of the scene.

In a further example, a camera may partition an image into multiple segments using an image segmentation process. Each segment may include a set of pixels of the image. The camera may identify segments that share respective characteristics and further identify boundaries of features in the scene based on the segments that share respective characteristics. A new version of the image with the focus upon an object in the scene and with the one or more other portions of the scene blurred. This may be generated by determining a boundary of an object in the portion of the scene based on the boundaries identified using the image segmentation process.

In another implementation, a camera may receive an input that specifies a focal aspect of the scene for the camera to focus upon when capturing the image. For example, the camera may receive the input via a touchscreen that displays a view of the scene from a viewpoint of the camera. As such, the camera may determine a disparity between how subpixel images depict a given portion of the scene that includes the focal aspect. This disparity may be used to generate a depth map of the scene.

In some embodiments, a disparity between the portion of the scene as represented by subpixel images may be determined by identifying a neighborhood of pixels in each subpixel image. The neighborhood of pixels of a given subpixel image may be shifted until substantially aligned with the other neighborhood of pixels of the other subpixel image. As a result, the disparity may be based on a pixel distance represented by the shift. The disparity may be subsequently used to generate a depth map of the scene.

In some examples, a confidence may be determined based on the alignment between neighborhoods of pixels between the subpixel images. The confidence may indicate how well pixels in the neighborhood of pixels from each subpixel image align after a given shift. As such, when the determined confidence is below a threshold confidence level, one or more subsequent shifts may be performed to determine a subsequent alignment between the neighborhoods of pixels from the subpixel images that produces a confidence above the threshold confidence level. When the determined confidence is above the threshold confidence level, the disparity may be determined between a portion of the scene as represented by both of the subpixel images.

4. EXAMPLE OPERATIONS

Figure 9:
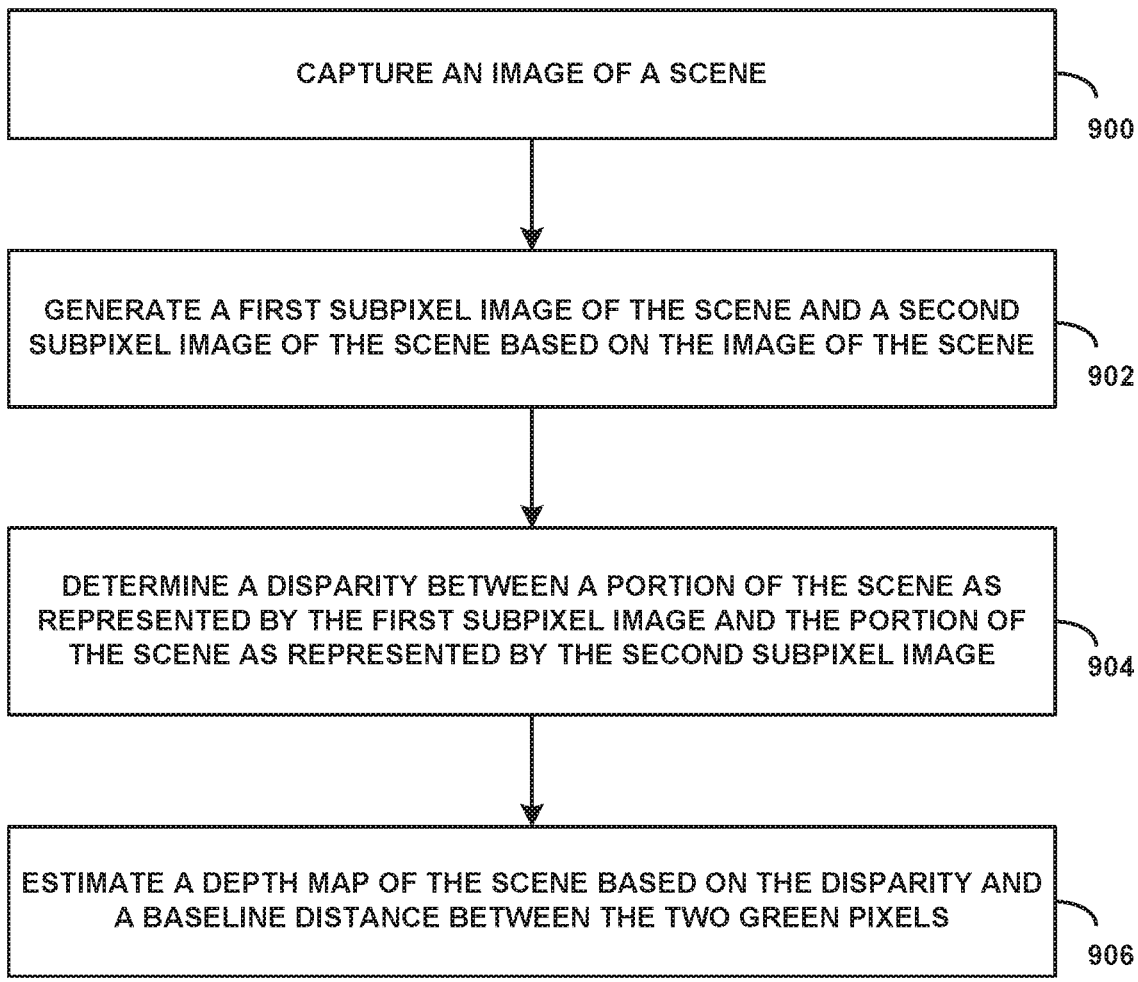
FIG. 9 is a flow chart, according to example embodiments.

FIG. 9 is a flow chart illustrating an example embodiment. The embodiment illustrated by FIG. 9 may be carried out by a computing device, such as digital camera device 100. However, the embodiment can be carried out by other types of devices or device subsystems. Further, the embodiment may be combined with any aspect or feature disclosed in this specification or the accompanying drawings.

Block 900 of FIG. 9 may involve capturing an image of a scene. The image capture component may include one or more apertures, lenses, and recording surfaces.

Block 902 may involve generating a first subpixel image of the scene and a second subpixel image of the scene based on the image of the scene. The first subpixel image may be represented by a first set of subpixels from the image and the second subpixel image may be represented by a second set of subpixels from the image. Each pixel in the image of the scene may include two green subpixels that are respectively represented in the first subpixel image and the second subpixel image. For example, each pixel of the image may have four subpixels arranged in a two subpixels by two subpixels square with a first green subpixel positioned on a top row of the two subpixels by two subpixels square and a second green subpixel positioned on a bottom row of the two subpixels by two subpixels square. In such an arrangement, the first green subpixel and the second green pixel may have a diagonal arrangement within each pixel of the image.

In some embodiments, the first subpixel image of the scene may represent the scene from a first angle and the second subpixel image of the scene may represent the scene from a second angle. The first angle may differ from the second angle. For example, the first subpixel image of the scene representing the scene from the first angle and the second subpixel image the scene representing the scene from the second angle may differ along a horizontal plane. In another example, the first subpixel image of the scene representing the scene from the first angle and the second subpixel image the scene representing the scene from the second angle may differ along a vertical plane. In some instances, the first subpixel image and the second subpixel image may represent the scene from angles that differ along both a horizontal plane and a vertical plane.

Block 904 may involve determining a disparity between a portion of the scene as represented by the first subpixel image and the portion of the scene as represented by the second subpixel image.

Block 906 may involve estimating a depth map of the scene based on the disparity and a baseline distance between the two green pixels. For instance, the depth map may indicate a depth of the portion of the scene relative to one or more other portions of the scene based on the disparity and a baseline distance between the two green subpixels. For example, the depth of a set of pixels of the image depicting the portion of the scene may be estimated relative to a depth of a number of pixels of the image depicting other portions of the scene.

Although not shown, the embodiment of FIG. 9 may further involve generating a new version of the image with a focus upon the portion of the scene and with the one or more other portions of the scene blurred based on the estimated depth of the portion of the scene relative to the one or more other portions of the scene.

Further, the embodiment of FIG. 9 may also involve partitioning the image into multiple segments using an image segmentation process. Each segment may include a set of pixels of the image. The embodiment may involve determining segments that share respective characteristics and identify boundaries of features in the scene depicted in the image based on the segments that share respective characteristics. In some instances, generating the new version of the image with the focus upon the portion of the scene and with the one or more other portions of the scene blurred may involve determining a boundary of an object in the portion of the scene based on the boundaries identified using the image segmentation process and generating the new version of the image with a focus on the object and with a background positioned behind the object blurred.

In another implementation, the embodiment of FIG. 9 may further involve receiving an input that specifies a focal aspect of the scene for the camera to focus upon when capturing the image. For example, receiving the input may involve receiving the input via a touchscreen configurable to display a view of the scene from a viewpoint of the camera. Determining the disparity between the portion of the scene as represented by the first subpixel image and the portion of the scene as represented by the second subpixel image may involve determining the disparity between a given portion of the scene that includes the focal aspect as represented by the first subpixel image and the second subpixel image.

In a further implementation, the embodiment of FIG. 9 may further involve determining a depth of the portion using a convolution neural network based mask.

The embodiment may further involve modifying the new version of the image with the focus upon the portion of the scene and with the one or more portions of the scene blurred based on the determined depth of the portion using the neural network based mask.

In some embodiments, determining the disparity between the portion of the scene as represented by the first subpixel image and the portion of the scene as represented by the second subpixel image involves identifying a first neighborhood of pixels in the first subpixel image and identifying a second neighborhood of pixels in the second subpixel image. The first neighborhood of pixels or the second neighborhood of pixels may be shifted until the first neighborhood of pixels and the second neighborhood of pixels are substantially aligned. The disparity is based on a pixel distance represented by the shift.

In some cases, shifting the first neighborhood of pixels or the second neighborhood of pixels may involve shifting the first neighborhood of pixels or the second neighborhood of pixels only on an x axis. Shifting the first neighborhood of pixels or the second neighborhood of pixels until the first neighborhood of pixels and the second neighborhood of pixels are substantially aligned may involve performing a first shift between the first neighborhood of pixels or the second neighborhood of pixels to determine a first alignment between the first neighborhood of pixels and the second neighborhood of pixels. One or more additional shifts between the first neighborhood of pixels or the second neighborhood of pixels may be used to improve the alignment between the first neighborhood of pixels and the second neighborhood of pixels.

A confidence may be determined based on the first alignment between the first neighborhood of pixels and the second neighborhood of pixels. For instance, the confidence may be determined by comparing how well pixels in the first neighborhood of pixels aligns match with pixels in the second neighborhood of pixels. When the determined confidence falls below a threshold confidence level, one or more subsequent shifts between the first neighborhood of pixels and the second neighborhood of pixels may be performed to determine a subsequent alignment between the first neighborhood of pixels and the second neighborhood of pixels that produces a confidence above the threshold confidence level. When the determined confidence is above the threshold confidence level, the disparity may be determined between the portion of the scene as represented by the first subpixel image and the portion of the scene as represented by the second subpixel image.

Substantial alignment as described herein may be an alignment in which an error factor between the blocks is minimized or determined to be below a threshold value. For instance, a least-squares error may be calculated for a number of candidate alignments, and the alignment with the lowest least squares error may be determined to be a substantial alignment.

In some embodiments, determining the disparity between the portion of the scene as represented by the first subpixel image and the portion of the scene as represented by the second subpixel image may involve performing a least-squares error process on a number of candidate alignments between a first neighborhood of pixels in the first subpixel image and a second neighborhood of pixels in the second subpixel image. Possibly based on performing the least-squares error process, an alignment may be determined between the first neighborhood of pixels and the second neighborhood of pixels such that the first neighborhood of pixels and the second neighborhood of pixels are substantially aligned. The disparity may be based on the determined alignment between the first neighborhood of pixels and the second neighborhood of pixels.

In some embodiments, estimating the depth of the portion of the scene relative to one or more other portions of the scene may involve estimating the depth of the portion of the scene using a spatial sensor of the camera device.

In further embodiments, generating the new version of the image with the focus upon the portion of the scene and with the one or more other portions of the scene blurred may involve performing edge aware smoothing on the new version of the image such that the portion of the scene has smooth edges relative to the one or more other portions of the scene that are blurred in the new version of the image.

In some embodiments, the portion of the scene may include a feature with a corner. In these cases, determining the disparity between the portion of the scene as represented in the first subpixel image and the portion of the scene as represented in the second subpixel image may involve detecting the corner in the first subpixel image and the second subpixel image, and warping the first subpixel image or the second subpixel image to the other according to a translation so that the corner in the first subpixel image and the second subpixel image substantially matches. The disparity may be based on a pixel distance represented by the translation.

Figure 10:
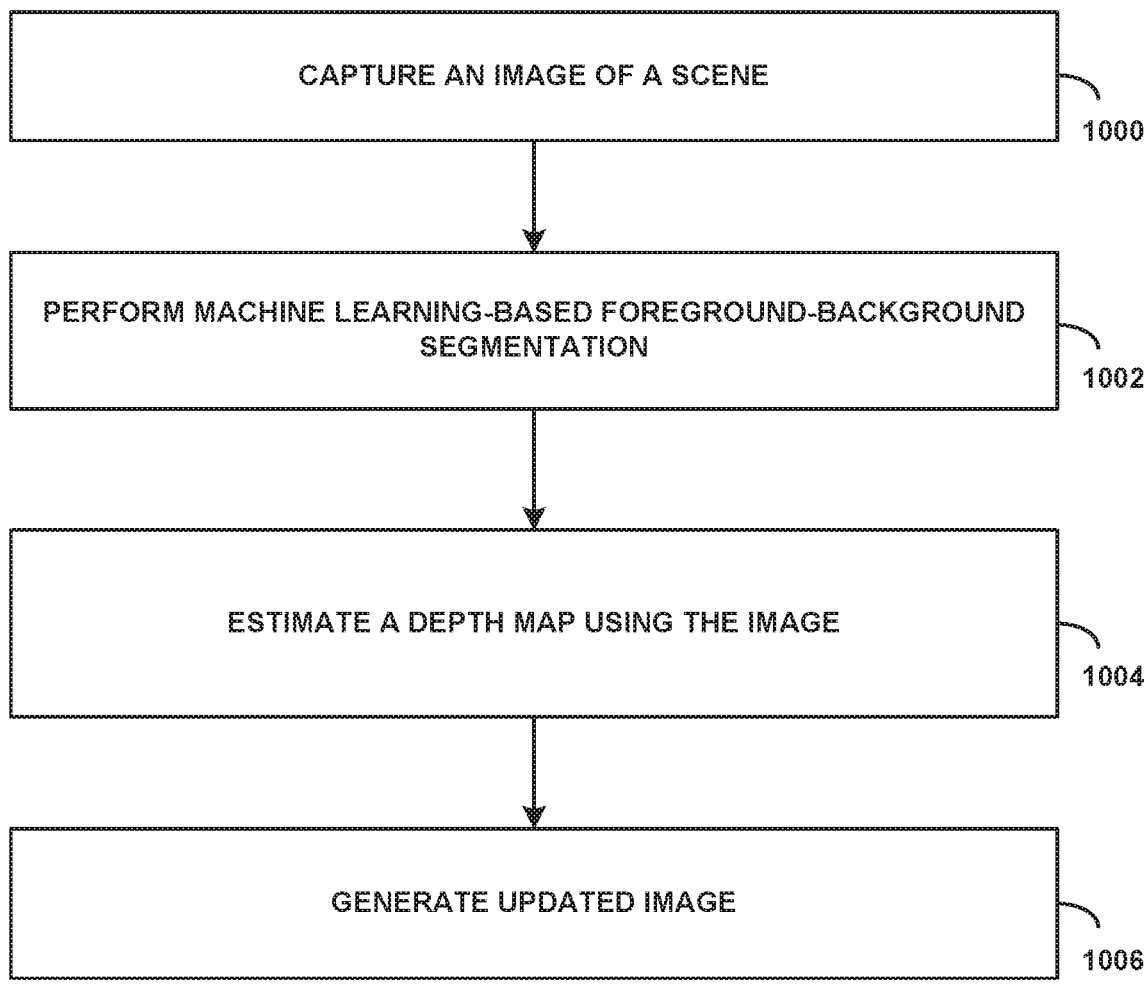
FIG. 10 is another flow chart, according to example embodiments.

FIG. 10 is another flow chart illustrating an example embodiment. The embodiment illustrated by FIG. 10 may be carried out by a computing device, such as digital camera device 100. However, the embodiment can be carried out by other types of devices or device subsystems. Further, the embodiment may be combined with any aspect or feature disclosed in this specification or the accompanying drawings.

Block 1000 of FIG. 10 may involve capturing an image of a scene. The image capture component may include one or more apertures, lenses, and recording surfaces. For instance, the image capture component may capture an image using a portrait mode or another mode that results in all elements within the captured image appearing sharp. In some examples, the mode that the camera is operating within when capturing the image may impact the process for producing a final rendered image based on the originally captured image.

In some implementations, capturing the image can involve performing one or multiple computational photography techniques to enhance the quality of the captured image. For example, an enhancement technique may involve capturing a burst of images that are underexposed to avoid blowing out highlights and then aligning and averaging these frames to reduce noise within the image. For instance, aligning and averaging the frames can reduce noise in the shadows (and other portions of the image) and responsively boost the shadows in a manner that preserves local contrast while also reducing global contrast. The above example technique as well as other techniques can cause the captured image to have a high dynamic range, low noise, and sharp details, even in images that capture scenes with dim lighting.

Further, in some instances, aligning and averaging frames to reduce noise may require additional analysis in order to limit double images (ghosts) from appearing in the image. Particularly, ghosts can appear within an image when the camera device is not steady during image capture or when features within the scene move during image capture. As such, the additional analysis and refinement can reduce and prevent ghosts from appearing in the captured image despite aligning and averaging frames to reduce noise within the image.

Block 1002 may involve performing machine learning-based foreground-background segmentation. Particularly, foreground-background segmentation can be used to determine which pixels of the image belong to the foreground (e.g., a person that is subject of focus) and which pixels belong to the background.

In some examples, a neural network is used to perform foreground-background segmentation on a captured image. The neural network may analyze the image in order to estimate which pixels represent a primary focus in the foreground and which pixels do not. This process may produce results similar to input image 800 and output image 804 shown in FIG. 8. In further instances, the neural network can be trained to detect pixels that correspond to an object positioned in the foreground of the image.

In some implementations, the neural network can be a convolutional neural network (CNN) with skip connections. The term "convolutional" can represent that the learned components of the network are in the form of filters (a weighted sum of the neighbor pixels around each pixel). As such, the CNN may filter the image and then further filter the filtered image. This filtering process using the CNN may be repeated in an iterative manner.

In addition, the skip connections associated with the CNN may allow information to easily flow from the early stages in the CNN process where the CNN reasons about low-level features (e.g., colors and edges) up to later stages of the CNN where the CNN reasons about high-level features (e.g., faces and body parts). Combining stages of processing using the CNN can identify and focus upon the desired subject of the image (e.g., focus upon the person), including identifying which pixels correspond to the desired object (e.g., which pixels correspond to the person).

In further examples, the CNN may use prior training by the CNN (e.g., analysis of hundreds, thousands, or millions of images) to enhance the performance of the CNN. For instance, the CNN may train and improve by analyzing numerous images of various scenes. As an example, a CNN used to perform foreground-background segmentation on images with people may train using images with people having various positions, orientations, and accessories (e.g., hats, sunglasses, ice cream cones) to enhance and refine subsequent performance of the CNN on new images of people. Other uses of a CNN can involve training the CNN to detect other objects within images.

In some implementations, the output of a CNN analysis may be smoothed in order to more clearly differentiate between the foreground and background of the original image. For example, the output may identify objects held by a person who is the main focus of the image and associate the held objects as part of the foreground. The results of a CNN analysis upon an image can be used to apply a uniform blurring of an entire background of the image. Although this can enhance the image, additional steps may be used to differentiate and blur objects at varying depths in the background differently.

In further examples, a foreground-background segmentation using a network can involve detecting objects in the foreground of the image that are not directly linked to the desired subject of focus of the image. For example, when the originally captured image depicts a scene involving the main subject (e.g., person) eating a piece of pie, the piece of pie can have an overall position within the image that is close to the camera. In such a situation, the piece of pie may not be identified by the CNN as part of the background. As a result, the CNN or another technique may explicitly identify the piece of pie (i.e., or other objects having similar positions close to the camera within a captured image) in order to allow subsequent blurring of its pixels to enhance the final rendered image since these pixels are part of an object in the foreground, but not directly part of the focused upon subject (e.g., the person).

Block 1004 may involve estimating a depth map using the image. Particularly, to enhance a final rendered image that blurs portions of the original image, depth at each point in the scene may be determined and used. In some examples, computing depth may involve using a stereo process. As discussed above, the camera may include pixels that can be divided into subpixels. For instance, the camera may include Phase-Detect Auto-Focus (PDAF) pixels, also referred to as dual-pixel autofocus (DPAF). In some examples, depth information may be used to supplement the analysis by a neural network when enhancing and producing the final image.

In some implementations, estimating the depth of an image may involve determining and using viewpoints from different portions of the lens of the camera. For instance, by splitting the lens of the camera into two halves (e.g., left and right, upper and lower), the view of the scene as seen through one half of the lens is slightly different from the view through the other side of the lens. The slight difference between the two viewpoints can be small, such as 1 millimeter apart (e.g., roughly the diameter of the lens) or less in some examples. Although the difference between the different viewpoints is miniscule, the difference can be enough to perform a stereo process to produce an estimated depth map of the scene.

The above process involving looking at the scene from different halves of the image lens can produce results that resemble splitting every pixel on the image sensor into two smaller side-by-side pixels and reading them from the image sensor separately. As such, some examples can involve using one or both techniques to produce a depth map. For example, one process may be used to check the depth estimation determined using the other process. In further examples, depth information for the image may be determined using only the process involving splitting the lens into two portions in order to reduce the time and resources required.

As discussed above, when the lens of a camera includes PDAF pixels or similar pixels that can be broken down into subpixels, different halves (e.g., left and right) of the lens in a single image capture can enable estimation of a depth map. The different viewpoints can be used as inputs to a stereo process to produce a low-resolution depth map. For instance, the process may perform subpixel-accurate tile-based alignment to produce a lower-resolution depth map that can be interpolated to a higher resolution depth map using a bilateral solver, which may perform simple filtering along with edge-aware smoothing. In some instances, PDAF pixels (or similar pixels) can enable divided views that correspond to the upper and lower halves of the lens, such as when the camera is held in a portrait orientation.

Further, in some instances when dividing the lens based on subpixels, the resulting depth map may appear monochrome, such as when only green pixels of the image sensor are used (i.e., without using red or blue pixels). Other examples, however, may involve using all the colors of the pixels.

In some examples, estimated depth information using one or more of the above techniques may include some inaccuracies due to low light or high noise in the images. As such, to reduce the inaccuracies, some depth estimation techniques may further involve capturing a burst of left-side and right-side images, and then aligning and averaging the images before proceeding to estimate depth using a stereo process. Aligning and average a burst of left-side and right-side (or upper and lower images) can reduce the noise and enhance the resulting low resolution depth map.

Block 1006 may involve generating an updated image. Particularly, the above techniques aim to produce a final image that includes enhancements compared to the originally captured image. For instance, the final image may utilize a blurring effect to help draw the attention of a view towards the main focus in the image in a manner similar to an image captured with a shallow depth of field. Particularly, an image with a shallow depth of field can help direct the attention of the viewer towards the focal point of the image and can also help suppress a cluttered background enhancing the overall presentation of the image.

In some examples, a combination between the segmentation mask computed at block 1002 and the depth map estimated at block 1004 can be used to determine how much to blur each pixel in the original image when producing the enhanced, final image. Particularly, focal features of the scene (e.g., person in the center of the image) present in the foreground may retain sharp pixels while other features that are part of the background of the scene can be blurred to enhance the final image. In some instances, pixels of features in the background of the image may be blurred in proportion based on how far each background feature is from the in-focus plane (e.g., from the camera). The estimated depth map can be used to estimate the distances between background features and the in-focus plane.

In some implementations, blurring pixels of background features can involve replacing the pixels with a translucent disk of the same color but varying size. By compositing all these disks in a depth order in a manner similar to averaging the disks, the results in the enhanced, final image are similar to a real optical blur that derives from using a single-lens reflex (SLR) camera with a big lens. The synthetic defocus applied using the above techniques can produce a disk-shaped Bokeh effect in the final image without requiring extensive equipment that other cameras often use to achieve the effect. Further, unlike SLR cameras, the Bokeh effect can be modified to have other shapes within final images using the above techniques since the Bokeh effect is applied in a synthetic manner.

In some examples, the above method may involve using only the depth map or a neural network upon a captured image. For instance, when the camera is in a portrait mode and captures an image without a person as the main focus, the neural network may fail to detect the presence of a person within the image during analysis and refrain from producing a useful segmentation mask. Despite the neural network failing to detect a person, estimated depth information can still be used to help compute a shallow depth-of-field image without neural network segmentation. Similarly, some implementations may involve using only the neural network technique without estimating the depth map of a scene. For instance, a device may be configured with a front camera that cannot split pixels for depth information. As a result, the resulting image may be refined using only a neural network analysis to determine which background pixels to blur in the final rendered image.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purpose of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    capturing, by a camera device, an image of a scene;
    based on the image of the scene, generating, by the camera device, a first subpixel image of the scene and a second subpixel image of the scene, wherein the first subpixel image is represented by a first set of subpixels from the image and the second subpixel image is represented by a second set of subpixels from the image, wherein a given pixel of the image of the scene includes two split-plane green subpixels, each of the two split-plane green subpixels comprising a respective first portion representing a first focal plane and a respective second portion representing a second focal plane, the first portion of both split-plane green subpixels represented in the first subpixel image and the second portion of both split-plane green subpixels represented in the second subpixel image;

determining, by the camera device, a disparity between a portion of the scene as represented by the first subpixel image and the portion of the scene as represented by the second subpixel image; and based on the disparity and a baseline distance between the two green subpixels, estimating, by the camera device, a depth map of the scene, wherein the depth map indicates a depth of the portion of the scene relative to one or more other portions of the scene.

2. The method of claim 1, further comprising:

based on the depth of the portion of the scene relative to the one or more other portions of the scene, generating, by the camera device, a new version of the image with a focus upon the portion of the scene and with the one or more other portions of the scene blurred.

3. The method of claim 2, wherein determining the disparity between the portion of the scene as represented by the first subpixel image and the portion of the scene as represented by the second subpixel image comprises:

identifying a first neighborhood of pixels in the first subpixel image;

identifying a second neighborhood of pixels in the second subpixel image; and shifting the first neighborhood of pixels or the second neighborhood of pixels until the first neighborhood of pixels and the second neighborhood of pixels are substantially aligned, wherein the disparity is based on a pixel distance represented by the shift.

4. The method of claim 3, wherein shifting the first neighborhood of pixels or the second neighborhood of pixels until the first neighborhood of pixels and the second neighborhood of pixels are substantially aligned comprises:

performing a first shift between the first neighborhood of pixels or the second neighborhood of pixels to determine a first alignment between the first neighborhood of pixels and the second neighborhood of pixels;

determining a confidence based on the first alignment between the first neighborhood of pixels and the second neighborhood of pixels; and based on the confidence being below a threshold confidence level, performing one or more subsequent shifts between the first neighborhood of pixels or the second neighborhood of pixels to determine a subsequent alignment between the first neighborhood of pixels and the second neighborhood of pixels that results in the confidence being above the threshold confidence level.

5. The method of claim 4, wherein determining the disparity between the portion of the scene as represented by the first subpixel image and the portion of the scene as represented by the second subpixel image comprises:

calculating least-squares error values of a plurality of candidate alignments between a first neighborhood of pixels in the first subpixel image and a second neighborhood of pixels in the second subpixel image; and based on the least-squares error values, determining an alignment between the first neighborhood of pixels and the second neighborhood of pixels such that the first neighborhood of pixels and the second neighborhood of pixels are substantially aligned, wherein the disparity is based on the determined alignment between the first neighborhood of pixels and the second neighborhood of pixels.

6. The method of claim 1, further comprising:

partitioning the image into a plurality of segments using an image segmentation process, wherein each segment of the plurality of segments comprises a set of pixels;

determining segments of the plurality of segments that share respective characteristics;

identifying boundaries of features in the scene depicted in the image based on segments that share respective characteristics;

determining one or more boundaries of an object in the portion of the scene based on the identified boundaries; and based on the depth map of the scene and the one or more boundaries of the object, generating a new version of the image with a focus on the object and with a background positioned behind the object blurred.

7. The method of claim 1, further comprising:

receiving, at the camera device from an input interface, an input that specifies a focal aspect of the scene for the camera to focus upon when capturing the image, wherein the input interface is a touchscreen configurable to display a view of the scene from a viewpoint of the camera;

wherein determining the disparity between the portion of the scene as represented by the first subpixel image and the portion of the scene as represented by the second subpixel image comprises:

determining the disparity between a given portion of the scene that includes the focal aspect as represented by the first subpixel image and the second subpixel image; and wherein estimating the depth map of the scene comprises:

estimating a depth of the given portion of the scene that includes the focal aspect.

8. The method of claim 1, wherein estimating the depth map of the scene comprises:

estimating the depth of the portion of the scene relative to the one or more other portions of the scene using a spatial sensor of the camera device.

9. The method of claim 1, wherein the first subpixel image of the scene represents the scene from a first angle, and wherein the second subpixel image of the scene represents the scene from a second angle.

10. The method of claim 9, wherein the first subpixel image of the scene representing the scene from the first angle and the second subpixel image the scene representing the scene from the second angle differ along a horizontal plane.

11. The method of claim 10, wherein the first subpixel image of the scene representing the scene from the first angle and the second subpixel image the scene representing the scene from the second angle differ along a vertical plane.

12. The method of claim 1, wherein the given pixel of the image comprises four subpixels arranged in a two subpixels by two subpixels square, and wherein a first green subpixel is positioned on a top row of the two subpixels by two subpixels square and a second green subpixel is positioned on a bottom row of the two subpixels by two subpixels square.

13. The method of claim 12, wherein the first green subpixel and the second green pixel are in a diagonal arrangement within the two subpixels by two subpixels square of the given pixel of the image.

14. The method of claim 1, wherein estimating the depth map of the scene comprises:
   estimating the depth of a set of pixels of the image depicting the portion of the scene relative to a depth of a plurality of pixels of the image depicting the one or more other portions of the scene.

15. The method of claim 1, further comprising:
   determining a depth of the portion of the scene using a neural network based mask; and
   based on the determined depth of the portion using the neural network based mask and the depth map of the scene, generating a new version of the image with a focus upon the portion of the scene and with the one or more other portions of the scene blurred.

16. An article of manufacture including a non-transitory computer-readable medium, having stored thereon program instructions that, upon execution by a camera device, cause the camera device to perform operations comprising:
   capturing an image of a scene;
   based on the image of the scene, generating a first subpixel image of the scene and a second subpixel image of the scene, wherein the first subpixel image is represented by a first set of subpixels from the image and the second subpixel image is represented by a second set of subpixels from the image, wherein a given pixel of the image of the scene includes two split-plane green subpixels, each of the two split-plane green subpixels comprising a respective first portion representing a first focal plane and a respective second portion representing a second focal plane, the first portion of both split-plane green subpixels represented in the first subpixel image and the second portion of both split-plane green subpixels represented in the second subpixel image;
   determining a disparity between a portion of the scene as represented by the first subpixel image and the portion of the scene as represented by the second subpixel image; and
   based on the disparity and a baseline distance between the two green subpixels, estimating a depth map of the scene, wherein the depth map indicates a depth of the portion of the scene relative to one or more other portions of the scene.

17. The article of manufacture of claim 16, wherein the operations further comprise:
   based on the estimated depth of the portion of the scene relative to the one or more other portions of the scene, generating a new version of the image with a focus upon the portion of the scene and with the one or more other portions of the scene blurred.

18. The article of manufacture of claim 16, wherein the given pixel of the image comprises four subpixels arranged in a two subpixels by two subpixels square, and wherein a first green subpixel is positioned on a top row of the two subpixels by two subpixels square and a second green subpixel is positioned on a bottom row of the two subpixels by two subpixels square.

19. The article of manufacture of claim 16, wherein the first subpixel image of the scene represents the scene from a first angle, and wherein the second subpixel image of the scene represents the scene from a second angle.

20. A camera device comprising:
   an image sensor;
   a processor;
   a memory; and
   program instructions, stored in the memory, that upon execution by the processor cause the camera device to perform operations comprising:
      capturing an image of a scene with the image sensor;
      based on the image of the scene, generating a first subpixel image of the scene and a second subpixel image of the scene, wherein the first subpixel image is represented by a first set of subpixels from the image and the second subpixel image is represented by a second set of subpixels from the image, wherein a given pixel of the image of the scene includes two split-plane green subpixels, each of the two split-plane green subpixels comprising a respective first portion representing a first focal plane and a respective second portion representing a second focal plane, the first portion of both split-plane green subpixels represented in the first subpixel image and the second portion of both split-plane green subpixels represented in the second subpixel image;
      determining a disparity between a portion of the scene as represented by the first subpixel image and the portion of the scene as represented by the second subpixel image; and
      based on the disparity and a baseline distance between the two green subpixels, estimating a depth map of the scene, wherein the depth map indicates a depth of the portion of the scene relative to one or more other portions of the scene.

* * * * *